(12) United States Patent
Mao et al.

(10) Patent No.: US 10,020,849 B2
(45) Date of Patent: Jul. 10, 2018

(54) SELF-CANCELING MAGNETIC STRUCTURES FOR TRANSFERRING POWER AND COMMUNICATION SIGNALS

(71) Applicant: x2 Power Technologies Limited, Grand Cayman (KY)

(72) Inventors: Hengchun Mao, Allen, TX (US); Bo Yang, Allen, TX (US)

(73) Assignee: x2 Power Technologies Limited, Grand Cayman (KY)

( * ) Notice: Subject to any disclaimer, the term of this patent is extended or adjusted under 35 U.S.C. 154(b) by 0 days.

(21) Appl. No.: 15/457,397

(22) Filed: Mar. 13, 2017

(65) Prior Publication Data

US 2017/0264343 A1     Sep. 14, 2017

Related U.S. Application Data

(60) Provisional application No. 62/307,915, filed on Mar. 14, 2016.

(51) Int. Cl.
| | |
|---|---|
| *H04B 5/00* | (2006.01) |
| *H01F 27/29* | (2006.01) |
| *H01F 27/28* | (2006.01) |
| *H01F 38/14* | (2006.01) |
| *H02J 50/10* | (2016.01) |

(52) U.S. Cl.
CPC ....... *H04B 5/0093* (2013.01); *H01F 27/2804* (2013.01); *H01F 27/29* (2013.01); *H01F 38/14* (2013.01); *H02J 50/10* (2016.02); *H04B 5/0031* (2013.01); *H04B 5/0037* (2013.01); *H01F 2027/2809* (2013.01); *H01F 2038/143* (2013.01)

(58) Field of Classification Search
CPC ......... H01F 2027/2809; H01F 27/2804; H01F 27/006; H01F 27/34; H01F 27/341; H01F 2027/348; H02J 50/10; H04B 5/0037; H04B 5/0093
See application file for complete search history.

(56) References Cited

U.S. PATENT DOCUMENTS

| | | | | |
|---|---|---|---|---|
| 6,481,701 | B2 * | 11/2002 | Kessen | B60G 15/062 267/166 |
| 9,711,278 | B2 * | 7/2017 | Park | H01F 38/14 |
| 2002/0125623 | A1 * | 9/2002 | Kessen | B60G 15/062 267/221 |
| 2007/0029305 | A1 * | 2/2007 | Peck | F27B 5/14 219/390 |
| 2007/0296369 | A1 * | 12/2007 | Yeh | H01F 5/003 318/696 |
| 2009/0096413 | A1 * | 4/2009 | Partovi | H01F 5/003 320/108 |

(Continued)

FOREIGN PATENT DOCUMENTS

DE     102004034611 A1     2/2006

*Primary Examiner* — Devan Sandiford
(74) *Attorney, Agent, or Firm* — Slater Matsil, LLP

(57) ABSTRACT

A structure comprises a plurality of first turns of a coil and a plurality of second turns of the coil having a similar shape as the plurality of first turns of the coil, wherein the plurality of first turns of the coil and the plurality of second turns of the coil have a similar center position and a current flowing through the plurality of first turns of the coil and a current flowing through the plurality of second turns of the coil are in opposite directions.

20 Claims, 17 Drawing Sheets

(56) References Cited

U.S. PATENT DOCUMENTS

| | | | |
|---|---|---|---|
| 2010/0141374 A1* | 6/2010 | Hopper | H01F 27/2804 336/226 |
| 2011/0281535 A1* | 11/2011 | Low | H02J 7/025 455/129 |
| 2013/0200721 A1* | 8/2013 | Kurs | H04B 5/0037 307/104 |
| 2013/0229064 A1* | 9/2013 | Moon | H04B 5/0037 307/104 |
| 2017/0117085 A1* | 4/2017 | Mao | H01F 27/2804 |

* cited by examiner

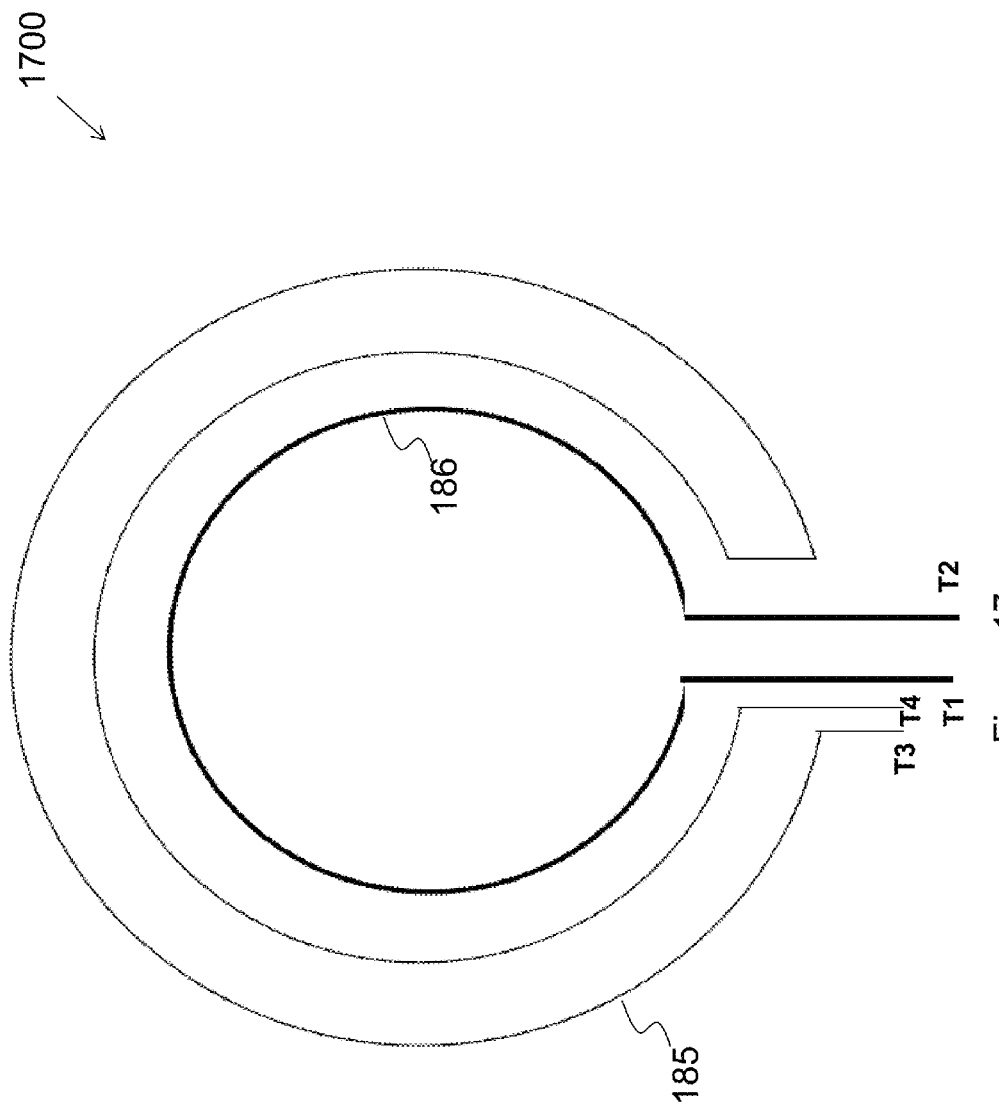

SELF-CANCELING MAGNETIC STRUCTURES FOR TRANSFERRING POWER AND COMMUNICATION SIGNALS

CROSS REFERENCE TO RELATED APPLICATIONS

This application is related to, and claims priority to, U.S. Provisional Application No. 62/307,915, titled, "Self-Canceling Magnetic Structures" filed on Mar. 14, 2016, which is herein incorporated by reference.

TECHNICAL FIELD

The present invention relates to a coil structure, and, in particular embodiments, to a coil structure in a wireless power transfer system.

BACKGROUND

Many power inductors, including those used in power converters and EMI filters, and transmitter coils and receiver coils in wireless power transfer (WPT) systems, are required to operate at high frequencies in a range from 10 KHz to few hundreds of MHz. To achieve better efficiency, the windings of such inductors are required to be carefully designed. Since magnetic materials' performance at such a higher frequency is not good or a significant magnetic field is need in a given space such as the space required in a WPT system, air core inductors are commonly employed.

One drawback of an air core inductor is it may cause significant magnetic interference to nearby components. More particularly, by employing the air core inductors, the interference between the air core inductors and the surrounding components can cause significant issues such as disturbing the operation and/or damaging the surrounding components, increasing power losses caused by induced eddy currents in the adjacent metal components, and/or the like.

FIG. 1 illustrates an implementation of a conventional coil structure. FIG. 1 shows a coil structure having two turns. These two turns 102 and 104 can be implemented as either wires or traces on a printed circuit board (PCB). As shown in FIG. 1, the first turn 102 starts from a first terminal of the coil structure 100 and ends at the starting point of the second turn 104. The second turn 104 ends at a second terminal of the coil structure 100. As shown in FIG. 1, the first turn 102 and the second turn 104 of the coil structure 100 are implemented as two concentric circles. The currents of these two concentric circles flow in a same direction as shown in FIG. 1. The coil structure 100 can be of other suitable shapes such as oval, rectangular and the like.

The coil structure 100 shown in FIG. 1 can provide the desired inductance of a wireless power transfer system. However, a significant portion of the magnetic field of the structure may expand out of the coil structure 100.

FIG. 2 illustrates a magnetic flux distribution of the coil structure shown in FIG. 1. The horizontal axis of FIG. 2 represents the distance from the center of the circles shown in FIG. 1. The unit of the horizontal axis is meter. The vertical axis represents the flux density of the magnetic field generated by the coil structure shown in FIG. 1. The unit of the vertical axis is Tesla. The flux density of the magnetic field is measured at a height of about 1 mm above the top surface of the coil structure 100 shown in FIG. 1. The flux density shown in FIG. 2 is taken along line A-A' shown in FIG. 1.

As shown in FIG. 2, the flux density has two positive peaks 112 and 116, and two negative peaks 114 and 118. Referring back to FIG. 1, the two turns of the coil structure 100 are immediately next to each other. In addition, the currents flowing through the two turns are in the same direction.

As shown in FIG. 2, slightly away from the peaks of the flux density, the magnetic field generated by the currents flowing through the two turns is not canceled out. As a result, the magnetic flux density in FIG. 2 takes a longer distance to decay to a lower value.

FIG. 3 illustrates another magnetic flux distribution of the coil structure shown in FIG. 1. The horizontal axis of FIG. 3 represents the distance from the center of the circles shown in FIG. 1. The unit of the horizontal axis is meter. The vertical axis represents the flux density of the magnetic field generated by the coil structure shown in FIG. 1. The unit of the vertical axis is Tesla. The flux density of the magnetic field is measured at a height of about 10 mm above the top surface of the coil structure 100. The flux density shown in FIG. 3 is taken along line A-A' shown in FIG. 1.

The magnetic flux distribution shown in FIG. 3 is similar to that shown in FIG. 2 except that the flux density of the magnetic field is measured at a height of about 10 mm rather than 1 mm above the top surface of the coil structure shown in FIG. 1.

As shown in FIGS. 2-3, since the magnetic flux density takes a longer distance to decay to a lower value, a significant amount of the magnetic flux generated from the coil structure 100 shown in FIG. 1 is outside the coil structure 100. This magnetic field may cut into nearby conductive components, thereby generating power losses and causing interference. Especially, if the coil structure 100 is a WPT coil and another component is a Near Field Communication (NFC) tag. When the NFC tag moves adjacent to the coil structure 100, the components in the NFC tag may be disturbed or damaged by the magnetic field generated by the coil structure 100. It is therefore important to have a coil structure with minimized impact on nearby components.

SUMMARY

In particular embodiments, a coil structure may have less magnetic interference with a nearby component in comparison with a conventional coil structure.

In accordance with an embodiment, a structure comprises a plurality of first turns of a coil and a plurality of second turns of the coil having a similar shape as the plurality of first turns of the coil, wherein the plurality of first turns of the coil and the plurality of second turns of the coil have a similar center position and a current flowing through the plurality of first turns of the coil and a current flowing through the plurality of second turns of the coil are in opposite directions.

In accordance with another embodiment, a system comprises a first coil having a first winding structure comprising a plurality of first turns and a plurality of second turns of the first coil having a similar shape, wherein the plurality of first turns and the plurality of second turns have a similar center position and a current flowing through the plurality of first turns and a current flowing through the plurality of second turns are in opposite directions and a second coil having a plurality of turns.

In accordance with yet another embodiment, a method comprises wirelessly transferring power from a transmitting coil on a transmitter to a receiving coil on a receiver, wherein each of the transmitting coil and the receiving coil comprises a plurality of first turns and a plurality of second turns having a similar shape, wherein a current flowing through the plurality of first turns and a current flowing through the plurality of second turns are in opposite directions and communicating between the transmitter and the receiver.

An advantage of a preferred embodiment of the present invention is improving a wireless power transfer system's performance through a winding structure having better magnetic flux distribution in comparison with a conventional winding structure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 17 illustrates yet another coil structure including both a power transfer coil and an auxiliary coil in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a coil structure applied in a wireless power transfer system. The coil structure can improve the performance of the wireless power transfer system. The coil structure described in this disclosure can be implemented in a variety of suitable materials and structures. For example, the winding structure may be integrated into a substrate such as a printed circuit board (PCB), or onto a non-conducting part such as a plastic back cover of a cell phone or a plastic case of electronic equipment. The invention may also be applied, however, to a variety of power systems. Hereinafter, various embodiments will be explained in detail with reference to the accompanying drawings.

Figure 4:
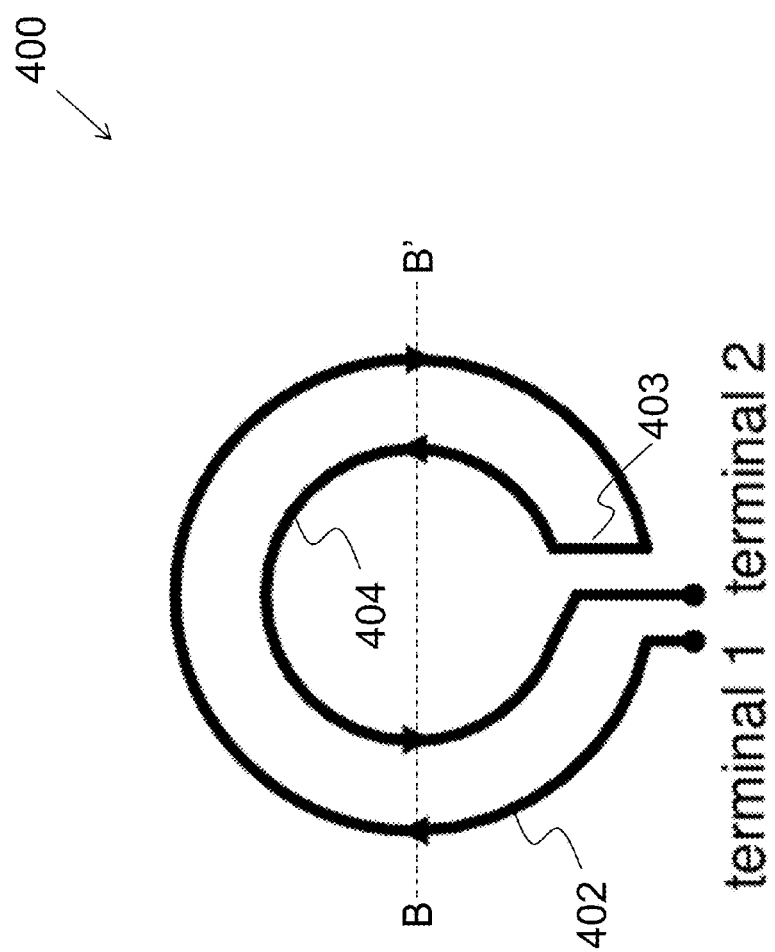
FIG. 4 illustrates a first implementation of a self-canceling coil structure in accordance with various embodiments of the present disclosure.

FIG. 4 illustrates a first implementation of a self-canceling coil structure in accordance with various embodiments of the present disclosure. FIG. 4 shows a two-turn configuration of a self-canceling coil structure 400. The self-canceling coil structure 400 shown in FIG. 4 is employed to reduce the flux expansion outside the coil structure so that the flux density generated by the self-canceling coil structure 400 decays rapidly to a lower value as the distance from the self-canceling coil structure 400 increases along the z-axis (a vertical direction) and along the x-axis (a horizontal direction). The flux density of the self-canceling coil structure 400 will be described below with respect to FIGS. 5-6. Throughout the description, the self-canceling coil structure 400 may be alternatively referred to as the coil structure 400 for simplicity.

As shown in FIG. 4, a first portion 402 of the coil structure 400 starts from terminal 1, which is a first terminal of the coil structure 400. The end of the first portion 402 is connected to a connection element 403. In some embodiments, the first portion 402 may comprise a plurality of turns. Alternatively, the first portion 402 comprises one turn of the coil structure 400 as shown in FIG. 4. Throughout the description, the first portion 402 may be alternatively referred to as the first turn 402.

A starting point of a second portion 404 of the coil structure 400 is connected to the connection element 403. The end of the second portion 404 is connected to terminal 2, which is a second terminal of the coil structure 400. In some embodiments, the second portion 404 may comprise a plurality of turns. Alternatively, the second portion 404 comprises one turn of the coil structure 400 as shown in FIG. 4. Throughout the description, the second portion 404 may be alternatively referred to as the second turn 404. As shown in FIG. 4, terminal 1 and terminal 2 are placed immediately next to each other.

The first turn 402 and the second turn 404 shown in FIG. 4 form two concentric circles. As shown in FIG. 4, the second turn 404 is placed next to the first turn 402. The second turn 404 is surrounded by the first turn 402. More particularly, the circular portion of the second turn 404 is enclosed by the circular portion of the first turn 402. In accordance with an embodiment, as shown in FIG. 4, when the current flowing through the first turn 402 is in a clockwise direction, the current flowing through the second turn 404 is in a counter-clockwise direction.

As shown in FIG. 4, the currents flowing into the two turns 402 and 404 have opposite directions, and thus the magnetic flux generated by these currents tend to cancel or reduce each other outside the coil structure 400. This is a self-cancellation effect of the coil structure 400. The resulting flux density at a point away from the coil (e.g., a point away from the coil structure along the Z-axis) may decay rapidly because the fluxes generated by these two currents having opposite directions may cancel each other out. At the same time, the magnetic field may strengthen within the space between the first turn 402 and the second turn 404. As a result, only a coil with a structure similar to the one shown in FIG. 4 can pick up significant amount of signal or power from the coil structure 400 shown in FIG. 4 when the coil is placed adjacent to the coil structure 400. Such a strengthened magnetic field helps to maintain a good coupling between the coils (e.g., coils on a transmitter and a receiver) of a wireless power transfer system, while the interference and/or damages to nearby electronic devices and/or components can be reduced or avoided.

In an embodiment, each portion (e.g., portions 402 and 404) may have one or more turns depending on design needs. It should be noted that the first portion 402 and the second portion 404 may not have exactly the same shape. As long as the first portion 402 and the second portion 404 are roughly similar in shape and have a similar center location, the advantages described above can be achieved. Furthermore, a part or the entire first portion 402 may have a different shape from the second portion 404. The opposite directions of the currents flowing through these two portions may help to achieve the self-cancellation effect even if these two portions have different shapes. However, better cancellation can be achieved if the distance or spacing between the conductors of the two portions is uniform and well controlled. The uniform spacing between the conductors of the two portions requires these two portions to have the same or a similar shape. Furthermore, the uniform spacing between the conductors of the two portions requires these two portions to have the same center location. Alternatively, the center of the first portion and the center of the second portion are adjacent to each other.

For example, a mobile phone may include a wireless power transfer system. More particularly, the mobile phone includes a receiving coil of the wireless power transfer system. When a card including a near field communication (NFC) tag is placed adjacent to the mobile phone, the coupling between the receiving coil and the NFC tag may cause interference as well as damages to the NFC tag. This undesired interference and/or damages can be fixed by replacing a conventional coil structure with the coil structure 400 shown in FIG. 4. In particular, the reduced flux expansion outside the coil structure 400 shown in FIG. 4 can help to reduce the coupling between the receiving coil and the NFC tag, thereby reducing interference and/or damages to the NFC tag.

In some embodiments, the coil structure 400 can be either used as a transmitting coil and/or a receiving coil in a wireless power transfer system. The circular shape of the coil structure 400 may help to overcome the misalignment between the transmitting coil and the receiving coil. For example, when both the transmitting coil and the receiving coil are implemented as 8-shaped coils (e.g., coil 161 in FIG. 11), the coupling between the transmitting coil and the receiving coil may deteriorate when a coil rotates away from its ideal position. In contrast, when both the transmitting coil and the receiving coil are implemented as the coil structure 400 shown in FIG. 4, the coupling between the transmitting coil and the receiving coil may remain substantially the same when one of the two coils rotates few degrees away from its ideal position.

Figure 5:
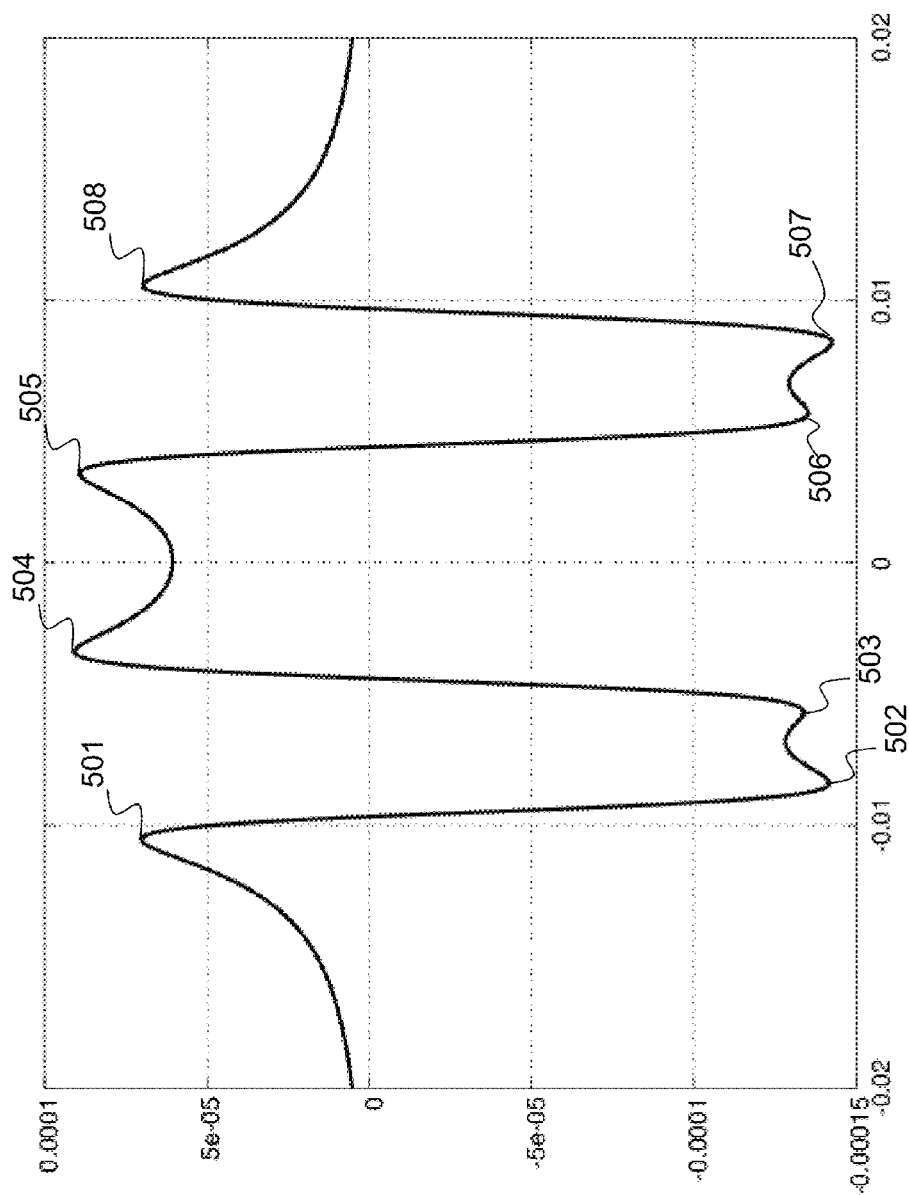
FIG. 5 illustrates a magnetic flux distribution of the coil structure shown in FIG. 4 in accordance with various embodiments of the present disclosure.

FIG. 5 illustrates a magnetic flux distribution of the coil structure shown in FIG. 4 in accordance with various embodiments of the present disclosure. The horizontal axis of FIG. 5 represents the distance from the center of the circles shown in FIG. 4. The unit of the horizontal axis is meter. The vertical axis represents the flux density of the magnetic field generated by the coil structure 400 shown in FIG. 4. The unit of the vertical axis is Tesla. The flux density of the magnetic field is measured along the z-axis at a height of about 1 mm above the top surface of the coil structure 400 shown in FIG. 4. The flux density shown in FIG. 5 is taken along line B-B' shown in FIG. 4.

FIG. 5 shows there are four positive flux density peaks 501, 504, 505 and 508, and four negative flux density peaks 502, 503, 506 and 507. In accordance with an embodiment, the positive flux density peak 501 and the negative flux density peak 502 are generated around the left side of the first turn 402 (the left intersection between the dashed line and the first turn 402 in FIG. 4). Likewise, the negative flux density peak 503 and the positive flux density peak 504 are generated around the left side of the second turn 404 (the left intersection between the dashed line and the second turn 404 in FIG. 4).

Figure 2:
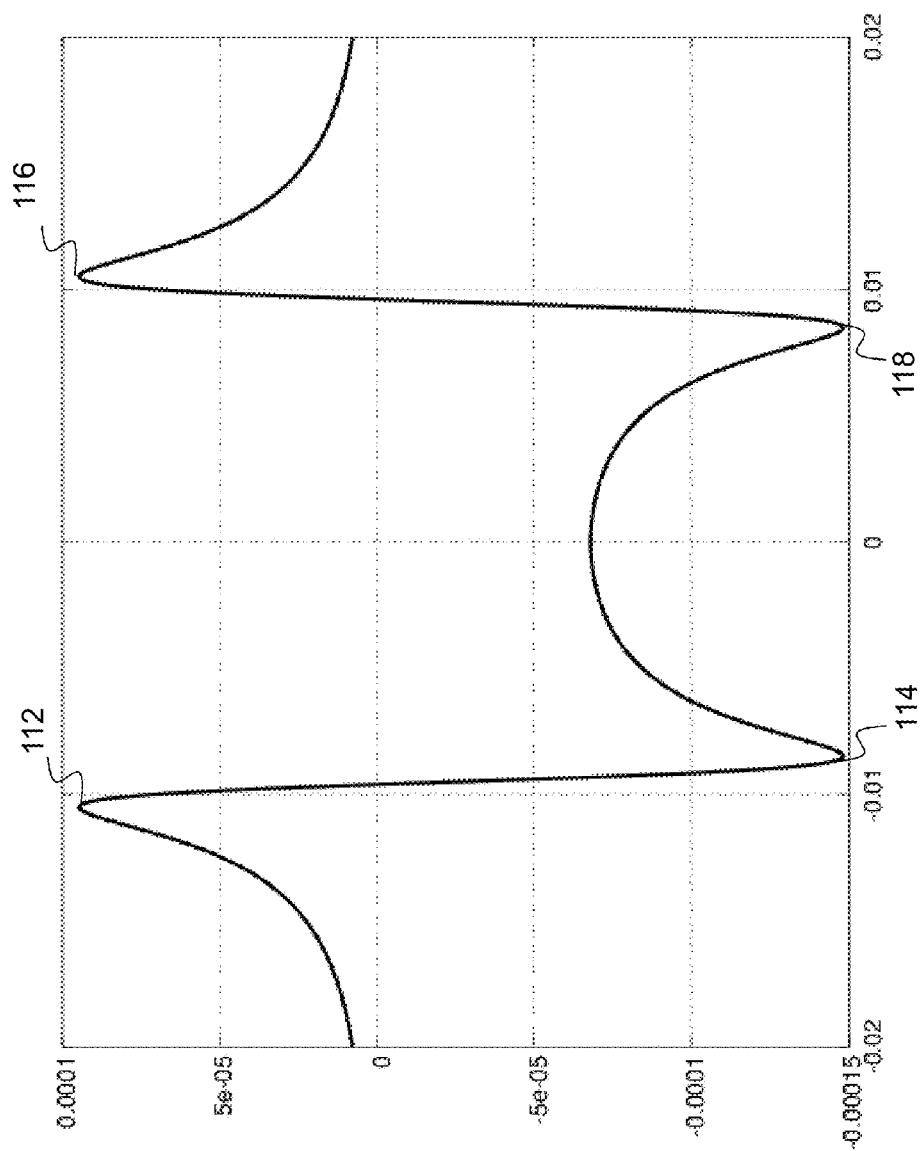
FIG. 2 illustrates a magnetic flux distribution of the coil structure shown in FIG. 1.

The positive flux density peak 505 and the negative flux density peak 506 are generated around the right side of the second turn 404 (the right intersection between the dashed line and the second turn 404 in FIG. 4). The negative flux density peak 507 and the positive flux density peak 508 are generated around the right side of the first turn 402 (the right intersection between the dashed line and the first turn 402 in FIG. 4). In comparison with the flux density distribution shown in FIG. 2, the flux density distribution in FIG. 4 shows the flux density is enhanced around the coil structure 400. For example, in FIG. 4 a larger area within the coil structure 400 has significant flux density while the flux density decays rapidly outside the coil structure 400.

Referring back to FIG. 4, the two portions 402 and 404 of the coil structure 400 are next to each other. In addition, the currents flowing through the two turns are in opposite directions. Slightly away from the coil, the magnetic fields generated by the currents flowing through the two turns are canceled each other. As a result, the magnetic flux density decays rapidly to a lower value outside a predetermined charging area around the coil structure 400. Such a fast decay of the magnetic field helps to reduce the impact of the coil structure 400 on the conductive components placed adjacent to the coil structure 400.

Figure 1:
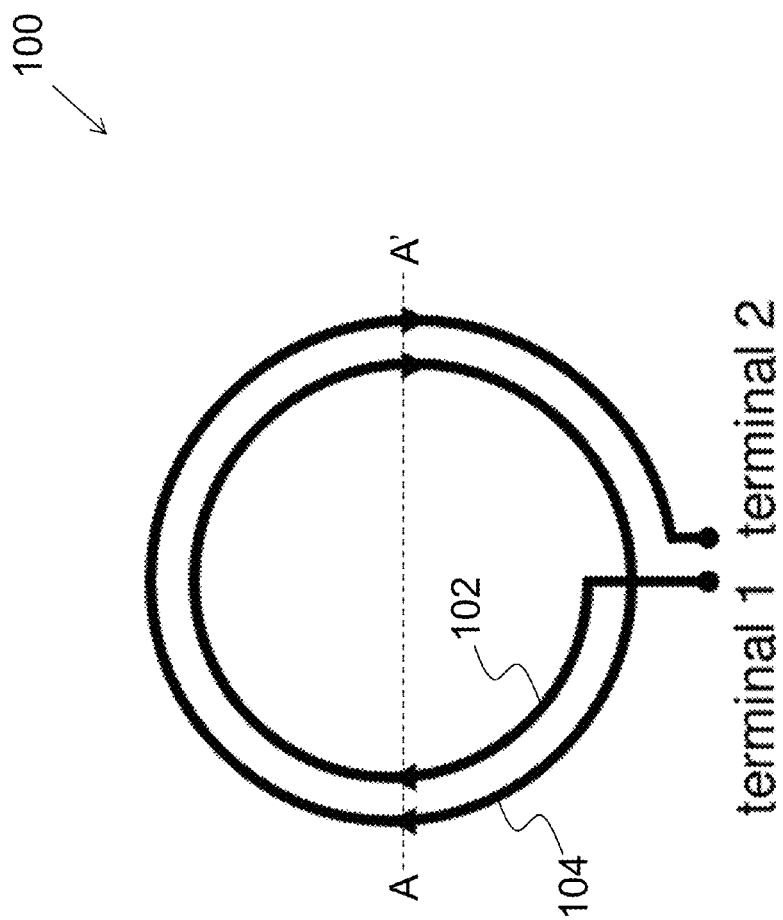
FIG. 1 illustrates an implementation of a conventional coil structure.

Sensitive components such as an NFC tag usually having a large coil similar to that shown in FIG. 1 may be placed adjacent to the coil structure 400. As a result of having the self-cancellation effect of the coil structure 400, the possibility of having some magnetic coupling issues such as interference, eddy current induced losses, damage to sensitive components such as an NFC IC/Tag, and the like is reduced or eliminated. The performance and reliability of a wireless power transfer system having the coil structure 400 may be improved accordingly.

Figure 6:
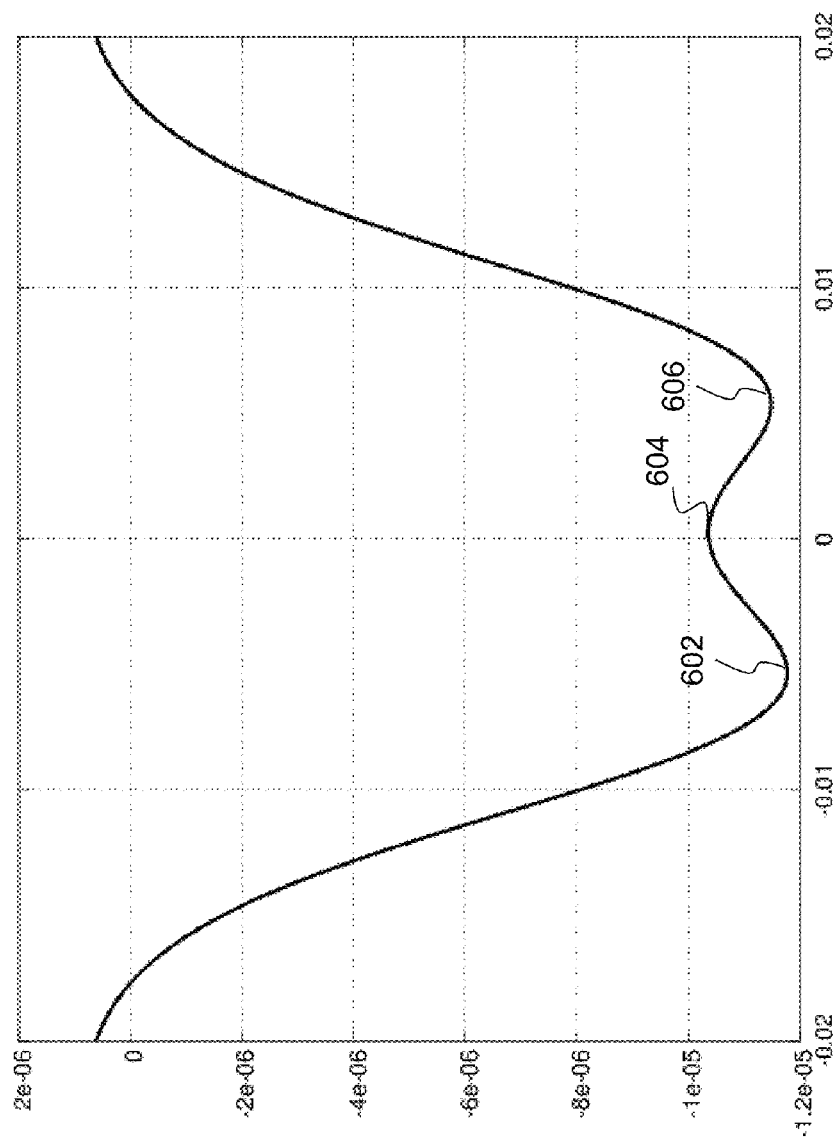
FIG. 6 illustrates another magnetic flux distribution of the coil structure shown in FIG. 4 in accordance with various embodiments of the present disclosure.

FIG. 6 illustrates another magnetic flux distribution of the coil structure shown in FIG. 4 in accordance with various embodiments of the present disclosure. The horizontal axis of FIG. 6 represents the distance from the center of the circles shown in FIG. 4. The unit of the horizontal axis is meter. The vertical axis represents the flux density of the magnetic field generated by the coil structure shown in FIG. 4. The unit of the vertical axis is Tesla. The flux density of the magnetic field is measured at a height of about 10 mm above the top surface of the coil structure shown in FIG. 4. The flux density shown in FIG. 6 is taken along line B-B' shown in FIG. 4.

The magnetic flux distribution shown in FIG. 6 is similar to that shown in FIG. 5 except that the flux density of the magnetic field is measured at a height of about 10 mm rather than 1 mm above the top surface of the coil structure shown in FIG. 4.

Figure 3:
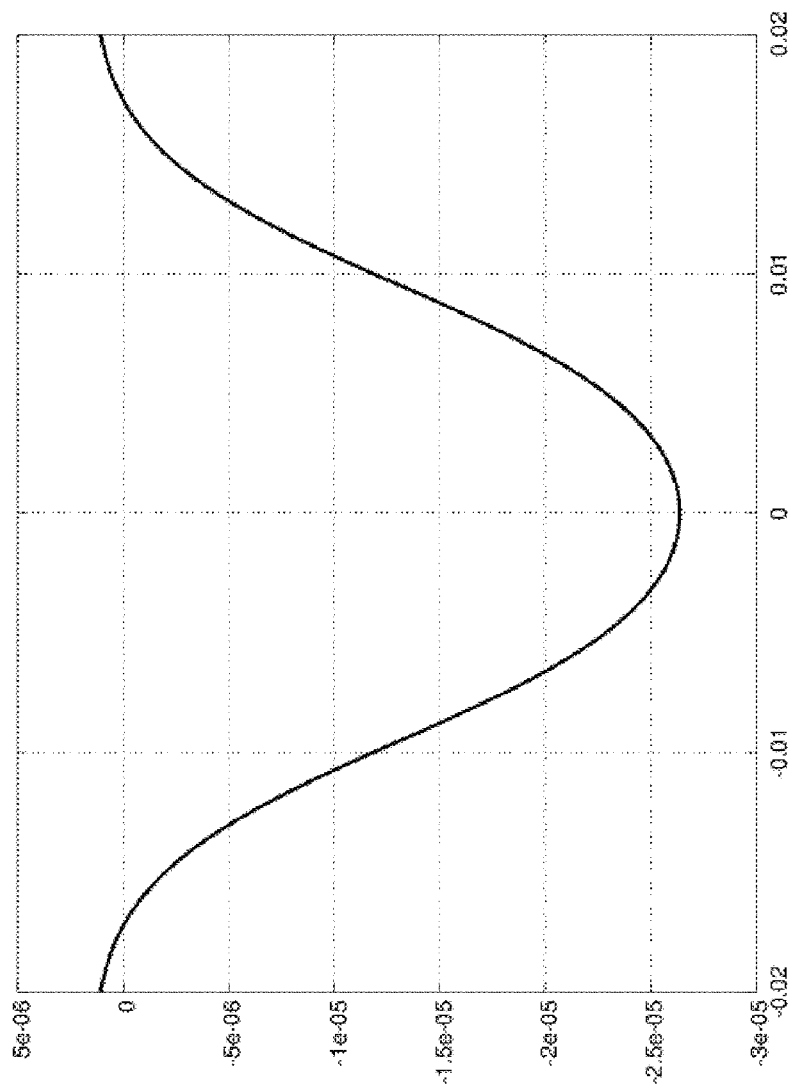
FIG. 3 illustrates another magnetic flux distribution of the coil structure shown in FIG. 1.

The magnetic flux distribution shown in FIG. 6 includes two negative peaks 602 and 602, and a negative valley 604. In comparison with the flux density shown in FIG. 3, the absolute value of the negative peaks of FIG. 6 is much lower than that shown in FIG. 3. Such a lower peak value helps to reduce the unnecessary coupling between the coil structure 400 and conductive components placed adjacent to the coil structure 400.

Figure 7:
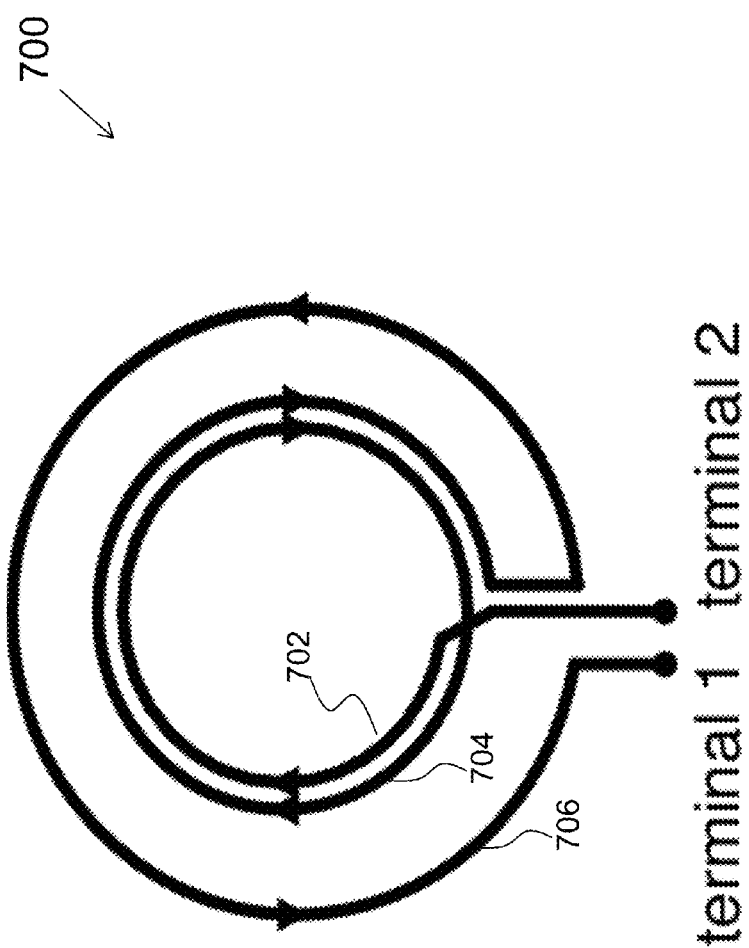
FIG. 7 illustrates a second implementation of a self-canceling coil structure in accordance with various embodiments of the present disclosure.

FIG. 7 illustrates a second implementation of a self-canceling coil structure in accordance with various embodiments of the present disclosure. FIG. 7 shows a multi-turn configuration of the self-canceling coil structure 700. Throughout the description, the self-canceling coil structure 700 may be alternatively referred to as the coil structure 700 for simplicity.

As shown in FIG. 7, the turns of the coil structure 700 can be divided into two groups. A first group includes one turn 706; a second group includes two turns 702 and 704 placed immediately next to each other. In some embodiments, the distance between the turn of the first group and its adjacent turn in the second group is greater than the distance between the two turns of the second group as shown in FIG. 7.

The three turns 702, 704 and 706 shown in FIG. 7 form three concentric circles. The current flowing through the first group (e.g., turn 706) is in a counter-clockwise direction. In contrast, the currents flowing through the second group (e.g., turns 702 and 704) are in a clockwise direction. In some embodiments, the three turns 702, 704 and 706 may be formed in a multi-layer board. For example, the turn 702 and the turn 704 may be in two different layers of the multi-layer board.

It should be noted that FIG. 7 illustrates the first group having one turn and the second group having two turns. This is merely an example. Depending on different applications and design needs, the number of turns of each group may vary accordingly. In other words, the number of turns in each group illustrated herein is limited solely for the purpose of clearly illustrating the inventive aspects of the various embodiments. The present invention is not limited to any specific number of turns.

In some embodiments, in order to achieve better magnetic coupling, a variety of parameters of the coil structure 700 may be used to improve the performance of the coil structure 700. In accordance with an embodiment, the number of turns in the second group and/or in the first group may be used as a first control variable. The distance between the first group and the second group may be used as a second control variable. By selecting appropriate values of the first control variable and the second control variable, several system performance indexes may be improved. For example, a smooth magnetic field within a transmitter coil structure may be achieved if the coil structure 700 shown in FIG. 7 is designed in the transmitter coil structure. Such a smooth magnetic field may help to improve the spatial stability of the coupling system between the transmitter coil and the receiver coil through maintaining a stable coupling factor between the transmitter coil and its corresponding receiver coil. In addition, by selecting the number of the turns of the second group and/or adjusting the spacing between these two groups, the magnetic field outside the coil structure 700 could be minimized, thereby reducing the EMI problems.

Figure 8:
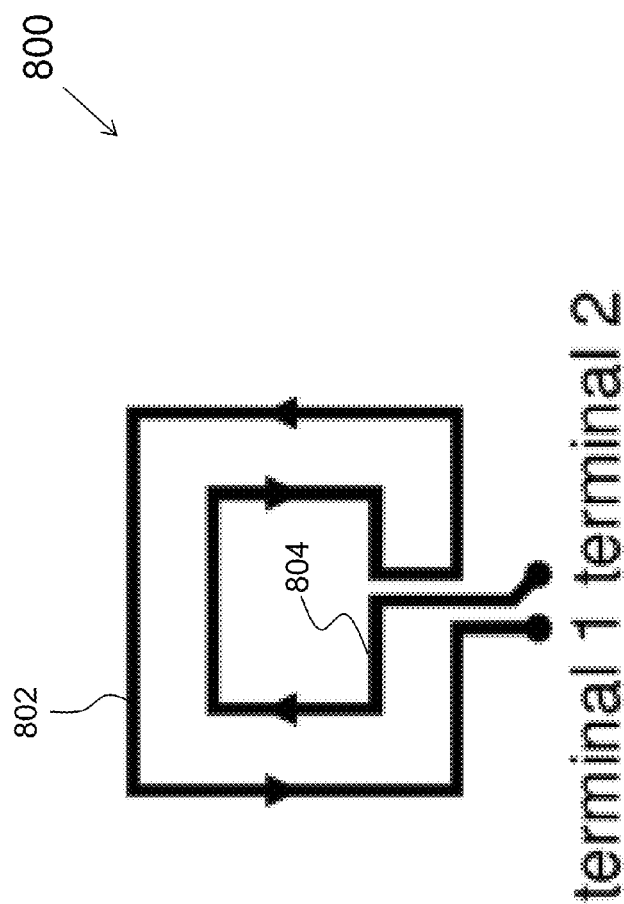
FIG. 8 illustrates a third implementation of a self-canceling coil structure in accordance with various embodiments of the present disclosure.

FIG. 8 illustrates a third implementation of a self-canceling coil structure in accordance with various embodiments of the present disclosure. The coil structure 800 shown in FIG. 8 is similar to the coil structure 400 shown in FIG. 4 expect that each turn is rectangular in shape. As shown in FIG. 8, a first turn 802 is rectangular in shape. The current flowing through the first turn 802 is in a counter-clockwise direction. The second turn 804 is rectangular in shape. The second turn 804 is surrounded by the first turn 802. The current flowing through the second turn 804 is in a clockwise direction. The advantage of having the self-canceling coil structure shown in FIG. 8 has been described above in detail with respect to FIG. 4, and hence is not discussed again for avoiding repetition.

It should be noted that the shape of the turns in FIG. 8 are selected purely for demonstration purposes and are not intended to limit the various embodiments of the present application to any particular shape. It is within the scope of various embodiments of the present disclosure for the turns 802 and 804 to comprise other shapes, such as, but no limited to oval, polygon, or any other suitable shapes.

Figure 9:
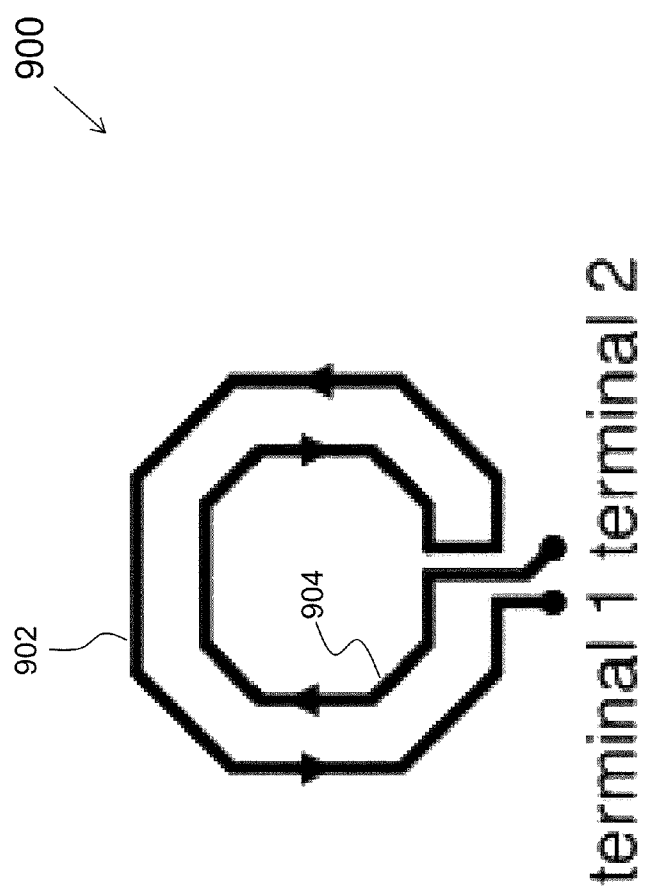
FIG. 9 illustrates a fourth implementation of a self-canceling coil structure in accordance with various embodiments of the present disclosure.

FIG. 9 illustrates a fourth implementation of a self-canceling coil structure in accordance with various embodiments of the present disclosure. The coil structure 900 shown in FIG. 9 is similar to the coil structure 400 shown in FIG. 4 expect that each turn is octagonal in shape.

As shown in FIG. 9, a first turn 902 is octagonal in shape. The current flowing through the first turn 902 is in a counter-clockwise direction. The second turn 904 is octagonal in shape. The current flowing through the second turn 904 is in a clockwise direction. The second turn 904 is surrounded by the first turn 902. In addition, each side of the second turn 904 is in parallel with a corresponding side of the first turn 902 as shown in FIG. 9. The advantage of having the self-canceling coil structure shown in FIG. 9 has been described above in detail with respect to FIG. 4, and hence is not discussed again for avoiding repetition.

It should be noted that the shape of the turns 902 and 904 in FIG. 9 are selected purely for demonstration purposes and are not intended to limit the various embodiments of the present application to any particular shape. It is within the scope of various embodiments for the turns to comprise other shapes, such as, but no limited to oval, polygon, or any other suitable shapes.

Figure 10:
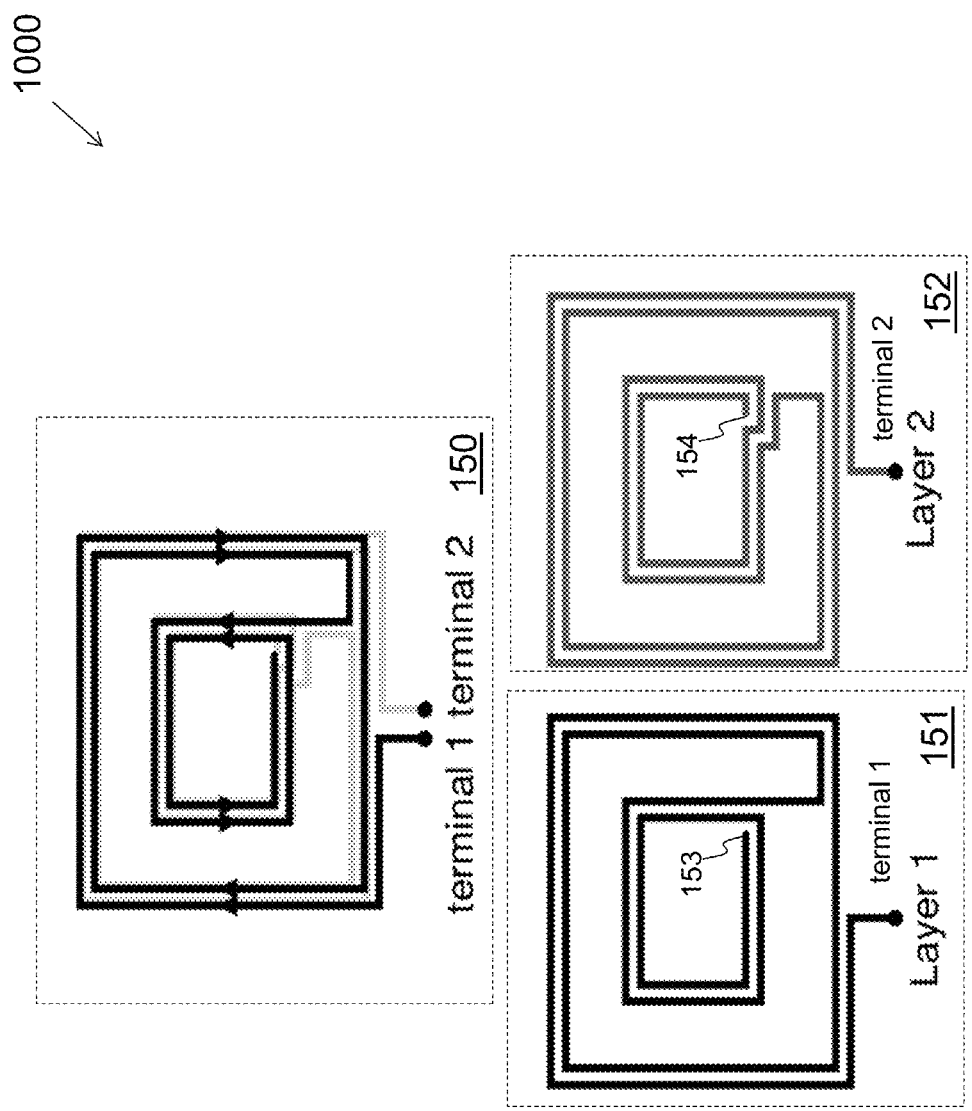
FIG. 10 illustrates a self-canceling coil structure formed in a multi-layer PCB in accordance with various embodiments of the present disclosure.

FIG. 10 illustrates a self-canceling coil structure formed in a multi-layer PCB in accordance with various embodiments of the present disclosure. The self-canceling coil structure 1000 is formed in two different PCB layers. As shown in FIG. 10, a top view 150 of the coil structure 1000 shows the coil structure is formed in two different PCB layers. At least a via (not shown) is connected between these two PCB layers. An upper terminal 153 of the via is connected to the trace on the first layer (shown in top view 151), and lower terminal 154 of the via is connected to the trace of the second layer (shown in top view 152).

Top views 151 and 152 show the turns of the coil structure 1000 are split into two portions. A first portion may be implemented as metal traces or metal tracks on the first layer of the PCB. A second portion may be implemented as metal traces or metal tracks on the second layer of the PCB. Furthermore, interconnect structures such as vias can be used to connect the metal traces on these two layers if necessary.

The top view 151 of the first PCB layer shows the trace of the first layer starts from terminal 1 and ends at the upper terminal 153 of the via. The top view 152 of the second PCB layer shows the trace on the second layer starts from the lower terminal 154 of the via and ends at terminal 2.

In some embodiments, the turns shown in FIG. 10 may be a plurality of metal tracks/traces on a plurality layers of a printed circuit board, or a metal pattern on one or two surfaces of a non-conductive body such as a plastic back cover of a cell phone, a smart watch or other devices, or a plastic case of equipment or devices. Furthermore, the metal pattern may be printed, coated, plated or otherwise deposited onto a side surface or two or more side surfaces of the non-conducting body.

One advantageous feature of having the multi-layer structure shown in FIG. 10 is that the traces of these two layers may be connected in series to provide higher inductance. On the other hand, in an alternative embodiment, the traces of these two layers may be connected in parallel to achieve lower resistance.

It should be noted that while the turns shown in FIG. 10 are substantially rectangular in shape, it is within the scope and spirit of the invention for the turns to comprise other shapes, such as, but not limited to oval, square, or circular. It should further be noted that while FIG. 10 illustrates each layer with four turns, the coil structure 1000 could accommodate any number of turns.

As the communication between transmitters and receivers has become an important requirement for designing a reliable and efficient wireless power transfer system having various features such as power control, status reporting, device authentication, advertisements and other suitable information exchanges, a variety of communication mechanisms have been adopted in the wireless power transfer system. One method is using Bluetooth (a wireless technology standard for exchanging data over short distances) as a communication link between a transmitter and a receiver of the wireless power transfer system. However, the Bluetooth circuit is relatively expensive. In addition, there may be a startup issue for the Bluetooth circuit on the receiver side if the power of the receiver side has been completely drained.

In some systems, an in-band communication technique can be employed to fulfill the communication between transmitters and receivers. More particularly, the signal of the in-band communication can be detected by the transmitter side by modulating the load or other circuit or operating parameters on the receiver side. The transmitter detects the signal and converts it into a corresponding digital signal. Similarly, a modulation of a circuit or operating parameter in a transmitter may be used to communicate a signal from the transmitter to one or more receivers coupled to the transmitter. In some embodiments, the modulation of the circuit or operating parameter means intentionally changing the circuit or operating parameter in a predetermined manner. The cost of implementing the in-band communication is relatively low. However, the accuracy of the in-band communication technique is sensitive to the load variations and other operation variations in the wireless power transfer system. In addition to the in-band communication through the power transfer coils in a wireless power transfer system, a more reliable communication channel can be established through a dedicated auxiliary coil which has lower interference with the power transfer coils.

Figure 11:
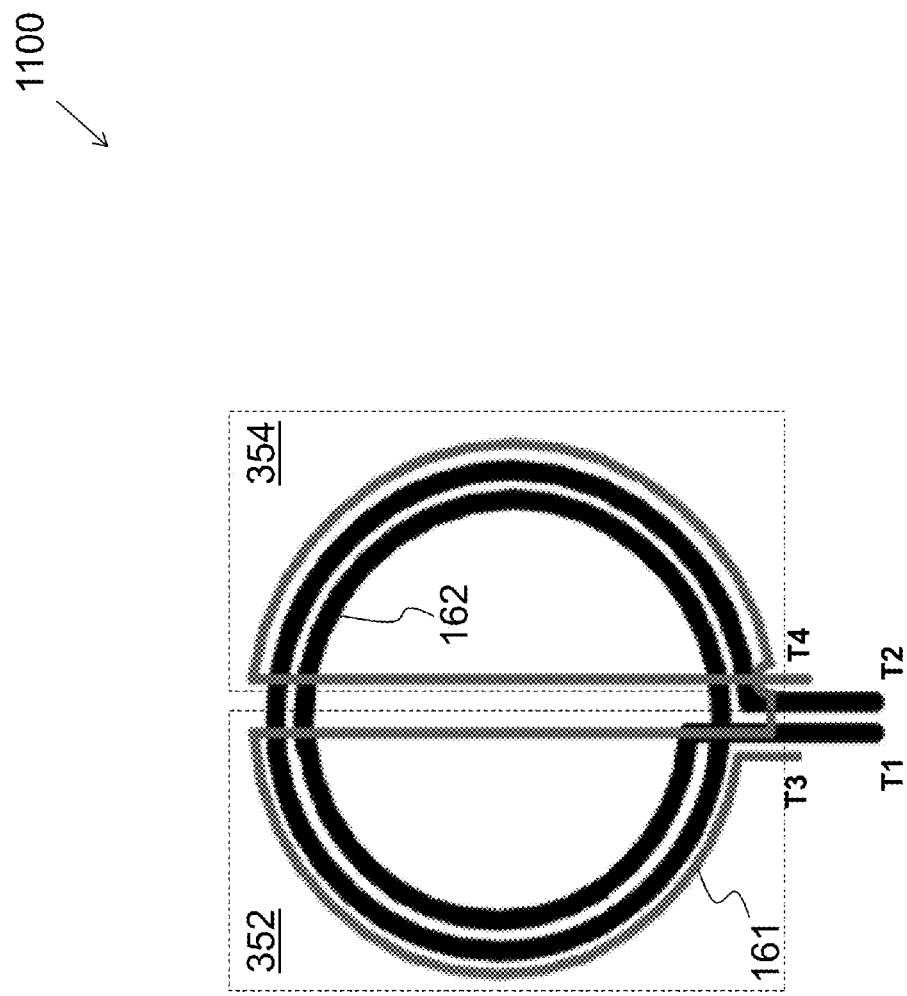
FIG. 11 illustrates a coil structure including both a power transfer coil and an auxiliary coil in accordance with various embodiments of the present disclosure.

FIG. 11 illustrates a coil structure including both a power transfer coil and an auxiliary coil in accordance with various embodiments of the present disclosure. FIG. 11 shows an auxiliary coil 161 and a wireless power transfer coil 162 are integrated in one coil structure 1100. As shown in FIG. 11, the auxiliary coil 161 is slightly bigger than the power transfer coil 162. In some embodiments, the auxiliary coil 161 may be a bias coil for supplying a bias voltage and/or a communication coil for providing a high speed, bi-directional communication link in a wireless power transfer system.

In alternative embodiments, the auxiliary coil 161 may be another power transfer coil providing power in a different path, a different frequency and/or a different power transfer standard in comparison with the main power transfer coil 162. In some embodiments, the auxiliary coil 161 may transfer both power and communication signals through a same in-band communication channel. The main power transfer coil 162 and the auxiliary coil 161 may operate simultaneously.

Furthermore, when the main power transfer coil 162 and the auxiliary coil 161 operate simultaneously, either one can be a receiver coil or a transmitter coil. In other words, it is possible to configure one coil of FIG. 11 to be a transmitter coil and the other to be a receiver coil when they operate simultaneously. Alternatively, both coils of FIG. 11 may function as transmitter coils coupled to their respective receiver coils (not shown). Furthermore, both coils of FIG. 11 may function as receiver coils coupled to their respective transmitter coils (not shown). In order to eliminate or reduce the magnetic interference between these two coils of FIG. 11, at least one of the coils 161 and 162 should have a self-cancellation magnetic structure.

In accordance with an embodiment, the auxiliary coil 161 is implemented as a communication coil. Throughout the description, the auxiliary coil 161 is alternatively referred to as the communication coil 161.

The communication coil 161 shown in FIG. 11 is coupled to a communication circuit (not shown) which can generate a plurality of voltage or current pulses suitable for communication purposes. As shown in FIG. 11, the power transfer coil 162 is implemented as a conventional multi-turn coil. More particularly, the power transfer coil 162 has two turns starting from terminal T1 and ending at terminal T2 as shown in FIG. 11. The flux generated by the power transfer coil 162 is basically unidirectional in the area enclosed by a communication coil 161.

The communication coil 161 may be implemented as a self-cancelling structure such as the coil structures shown in FIGS. 4 and 7-10. Alternatively, the communication coil 161 may be an 8-shaped structure as shown in FIG. 11. The communication coil 161 has a self-enclosed magnetic path. As shown in FIG. 11, the communication coil 161 is divided into two portions, namely a first portion 352 and a second portion 354. Each portion comprises a straight line and an arc. The straight line of the first portion 352 and the straight line of the second portion 354 are placed adjacent to each other, thereby enhancing the magnetic flux distribution of the communication coil 161. The arc of each portion connects the two terminals of the straight line with a relatively short length for a given area. Such a relatively short length helps to reduce the resistance of the communication coil 161.

As shown in FIG. 11, the first portion 352 forms a first half circle. Likewise, the second portion 354 forms a second half circle. When a current flows through the communication coil 161, each portion of the winding will generate a magnetic flux. The direction of the magnetic flux in the first half circle is opposite to the direction of the magnetic flux in the second half circle with reference to the vertical axis which is perpendicular to the winding. The magnetic fluxes in opposite directions form a self-enclosed magnetic path. Such a self-enclosed magnetic path helps to enhance the magnetic field within these two portions 352 and 354, and reduce the magnetic flux outside the communication coil 161 through a self-cancellation effect.

With the coil arrangement shown in FIG. 11, the magnetic field generated by the power transfer coil 162 generates a very low voltage (approximately equal to zero) across two terminals T3 and T4 of the communication coil 161. At the same time, the magnetic field generated by the communication coil 161 generates a very low voltage (approximately equal to zero) across two terminals T1 and T2 of the power transfer coil 162. Such low voltages (e.g., voltage across T3 and T4, and voltage across T1 and T2) help to eliminate or reduce the interference or damages to coils and/or circuits coupled to the coils shown in FIG. 11.

In some embodiments, the communication coil 161 is so arranged such that the magnetic fluxes coupled to both the first portion 352 and the second portion 354 can form a closed loop within the space immediately adjacent to the communication coil 161, and the current in each portion of the communication coil 161 strengthens this coupled flux. In contrast, to a point outside this space, the magnetic flux there has been weakened because the magnetic flux from the first portion 352 and the magnetic flux from the second portion 354 tend to cancel each other out.

It should be noted that the communication coil 161 may be formed in at least two different layers of a PCB. In an embodiment, the communication coil 161 may be formed in two PCB layers immediately next to each other. Alternatively, the PCB layers where the communication coil 161 is formed may be separated by other PCB layers. Furthermore, the communication coil 161 and the power transfer coil 162 may be formed in different layers of the PCB.

In the communication coil 161, the 8-shaped structure helps to enhance the magnetic field within these two portions 352 and 354 and reduce the magnetic flux outside the communication coil 161. As a result, the communication signal from the other communication coil coupled to the communication coil 161 can generate a strong coupling to a nearby coil with a similar structure, thereby producing a strong signal or a large amount of power transfer to the nearby coil.

Figure 12:
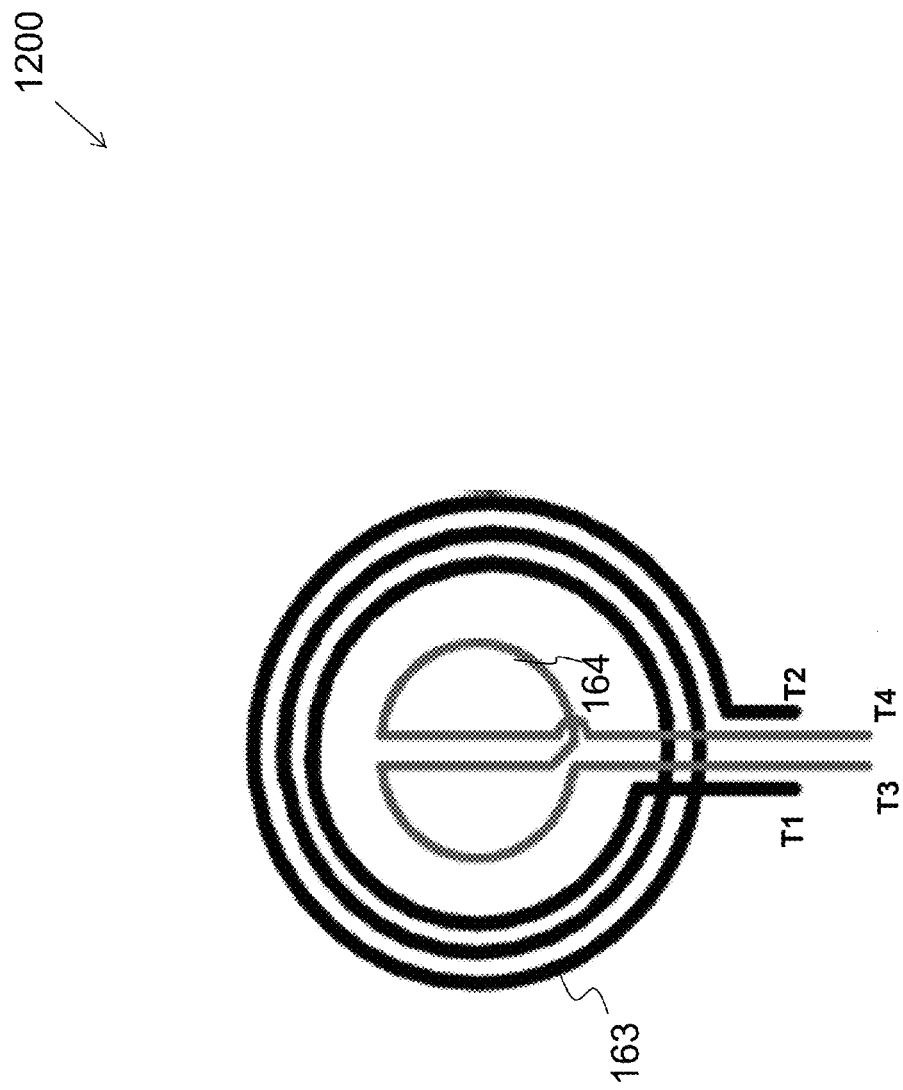
FIG. 12 illustrates another coil structure including both a power transfer coil and an auxiliary coil in accordance with various embodiments of the present disclosure.

FIG. 12 illustrates another coil structure including both a power transfer coil and an auxiliary coil in accordance with various embodiments of the present disclosure. The coil structure 1200 shown in FIG. 12 is similar to the coil structure 1100 shown in FIG. 11 except that the power transfer coil 163 has three turns and the communication coil 164 is smaller than the power transfer coil 163, and the communication coil 164 is located inside and surrounded by the power transfer coil 163. In some embodiments, the power transfer coil 163 and the communication coil 164 may be formed in two different layers of a PCB.

One advantageous feature of having the coil structure 1200 shown in FIG. 12 is the 8-shaped structure of the communication coil 164 is a self-cancellation magnetic structure. As a result, the interference between the communication coil 164 and the power transfer coil 163 has been minimized.

Figure 13:
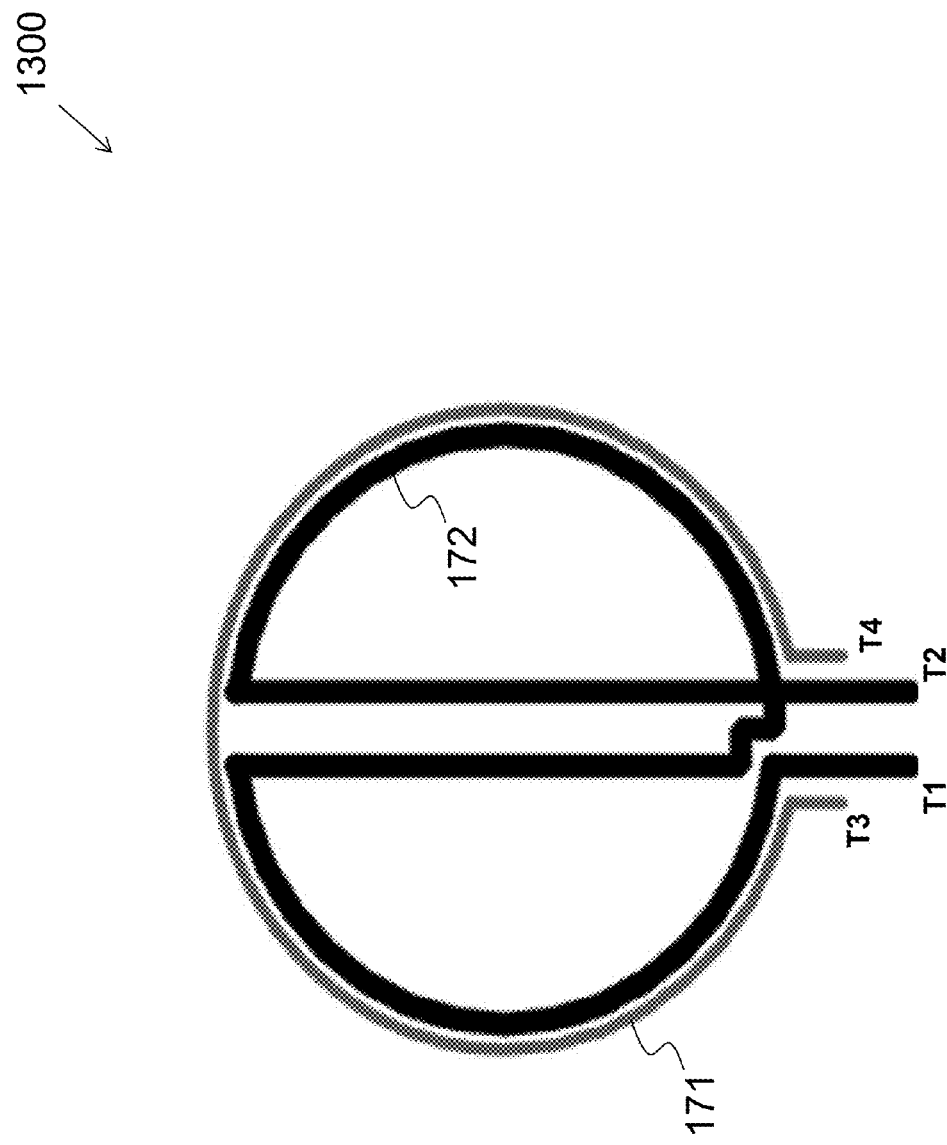
FIG. 13 illustrates yet another coil structure including both a power transfer coil and an auxiliary coil in accordance with various embodiments of the present disclosure.

FIG. 13 illustrates yet another coil structure including both a power transfer coil and an auxiliary coil in accordance with various embodiments of the present disclosure. The coil structure 1300 shown in FIG. 13 is similar to the coil structure 1100 shown in FIG. 11 except that the power transfer coil 172 has an 8-shaped structure. In some embodiments, the 8-shaped structure may be formed in two different layers of a PCB. The operation and the advantage of the 8-shaped structure have been described above with respect to FIG. 11, and hence are discussed again to avoid repetition.

It should be noted the 8-shaped structure is merely an example. A person skilled in the art would understand there may be variations, modifications and alternatives. For example, the power transfer coil 172 can be other suitable coil structures such as the self-cancelling coils shown in FIGS. 4 and 7-10.

As shown in FIG. 13, the communication coil 171 has one turn, which can be implemented as a coil circular in shape. Alternatively, the communication coil 171 can other suitable coils such as a race track coil, a round coil or a rectangular coil. The communication coil 171 can be placed in a transmitter and/or a receiver coupled to the transmitter. In some embodiments, the communication coil 171 is independently controlled. As such, the communication coil 171 does not rely on the wireless power transfer system to transfer communication signals. Therefore, the communication based upon the coil structure shown in FIG. 13 is immune to load variations and other transients in the wireless power transfer system. The communication coil 171 is able to transfer bi-directional signals. Such a bi-directional communication system can greatly improve the wireless power transfer system's performance by providing a negotiation path between the transmitter and the receiver of the wireless power transfer system.

Figure 14:
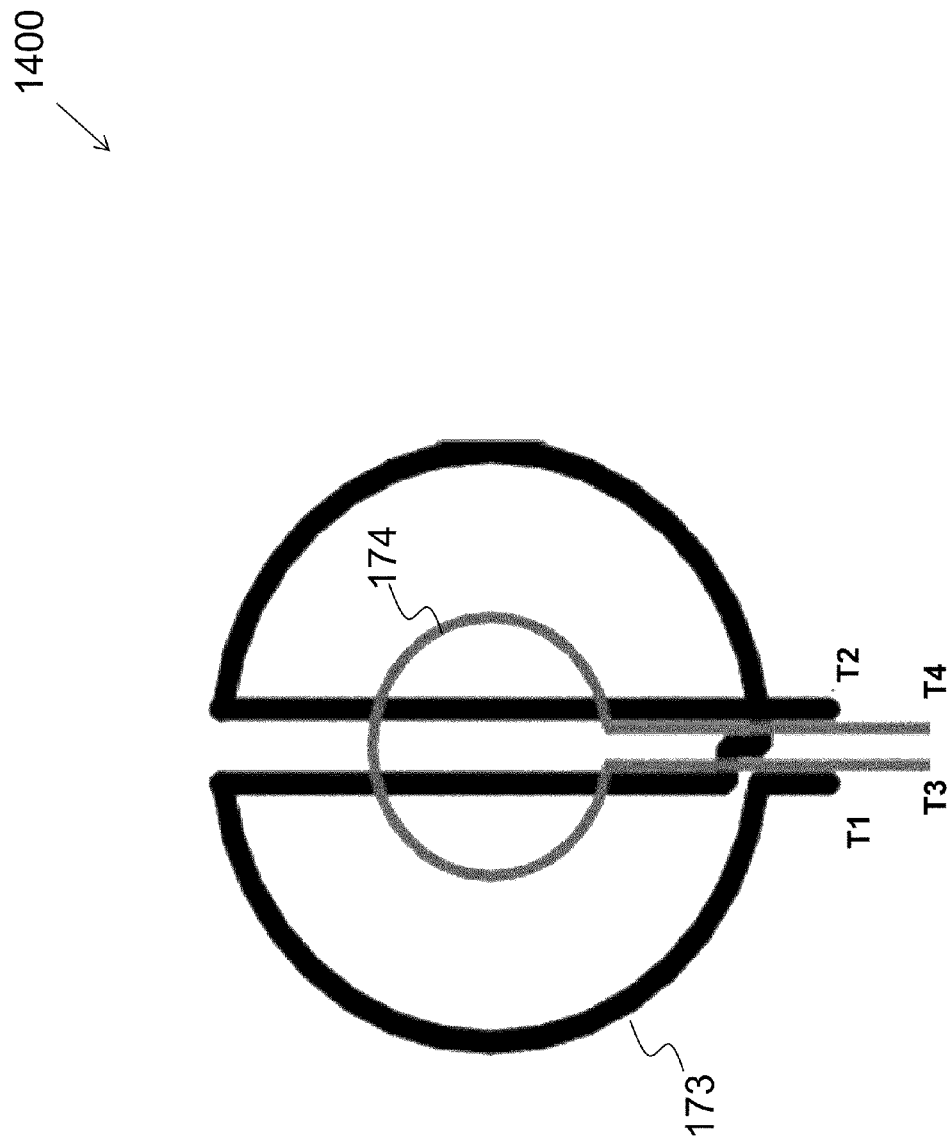
FIG. 14 illustrates yet another coil structure including both a power transfer coil and an auxiliary coil in accordance with various embodiments of the present disclosure.

FIG. 14 illustrates yet another coil structure including both a power transfer coil and an auxiliary coil in accordance with various embodiments of the present disclosure. The coil structure 1400 shown in FIG. 14 is similar to the coil structure 1300 shown in FIG. 13 except that the diameter of the power transfer coil 173 is greater than the diameter of the communication coil 174. More particularly, the communication coil 174 is surrounded by the power transfer coil 173. It should be noted that, in some embodiments, the power transfer coil 173 and the communication coil 174 may be formed in two different layers of a PCB.

Figure 15:
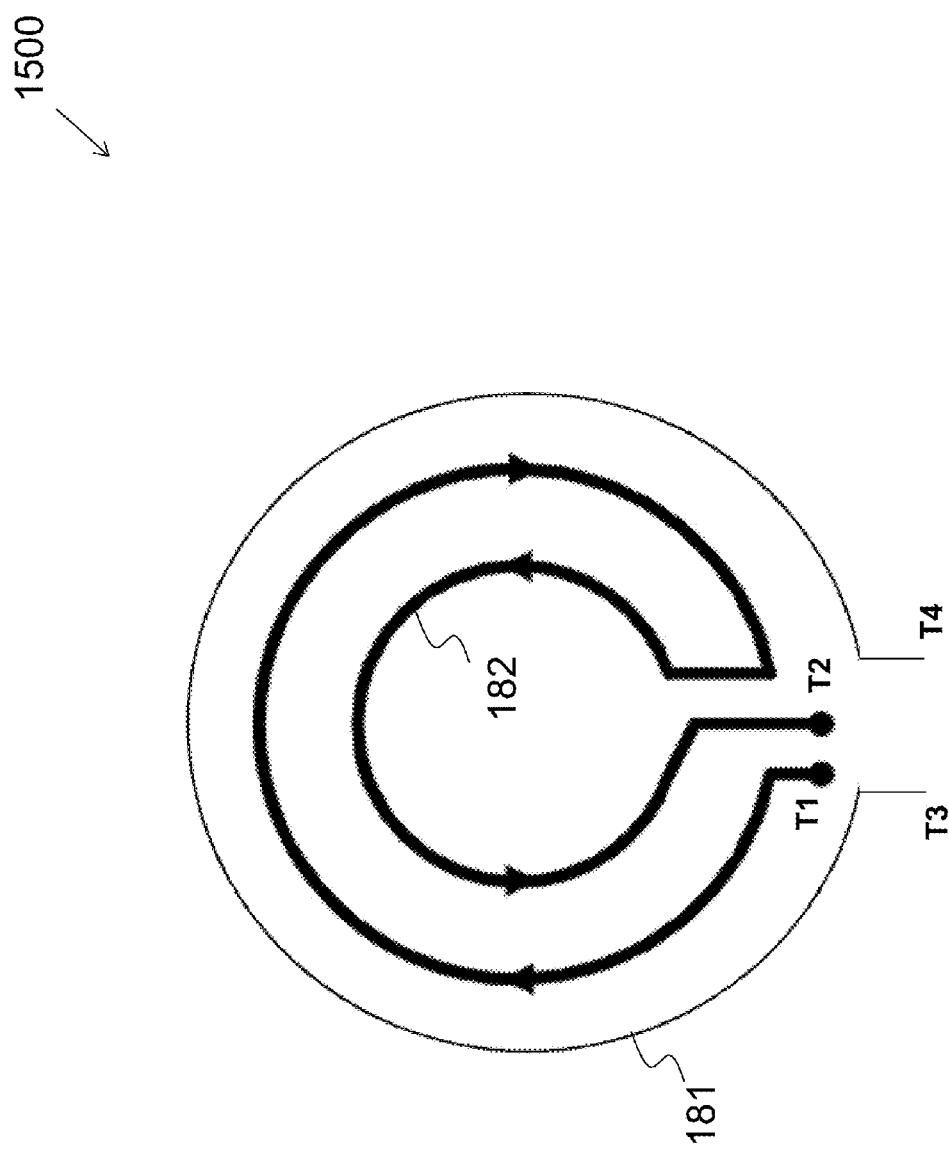
FIG. 15 illustrates yet another coil structure including both a power transfer coil and an auxiliary coil in accordance with various embodiments of the present disclosure.

FIG. 15 illustrates yet another coil structure including both a power transfer coil and an auxiliary coil in accordance with various embodiments of the present disclosure. The coil structure 1500 shown in FIG. 15 is similar to the coil structure 1300 shown in FIG. 13 except that the power transfer coil 182 has a structure similar to that shown in FIG. 4. It should be noted that while the diameter of the auxiliary coil 181 is greater than the diameter of the power transfer coil 182, the diameter of the power transfer coil 182 may be greater than the diameter of the auxiliary coil 181 depending on different applications and design needs.

Figure 16:
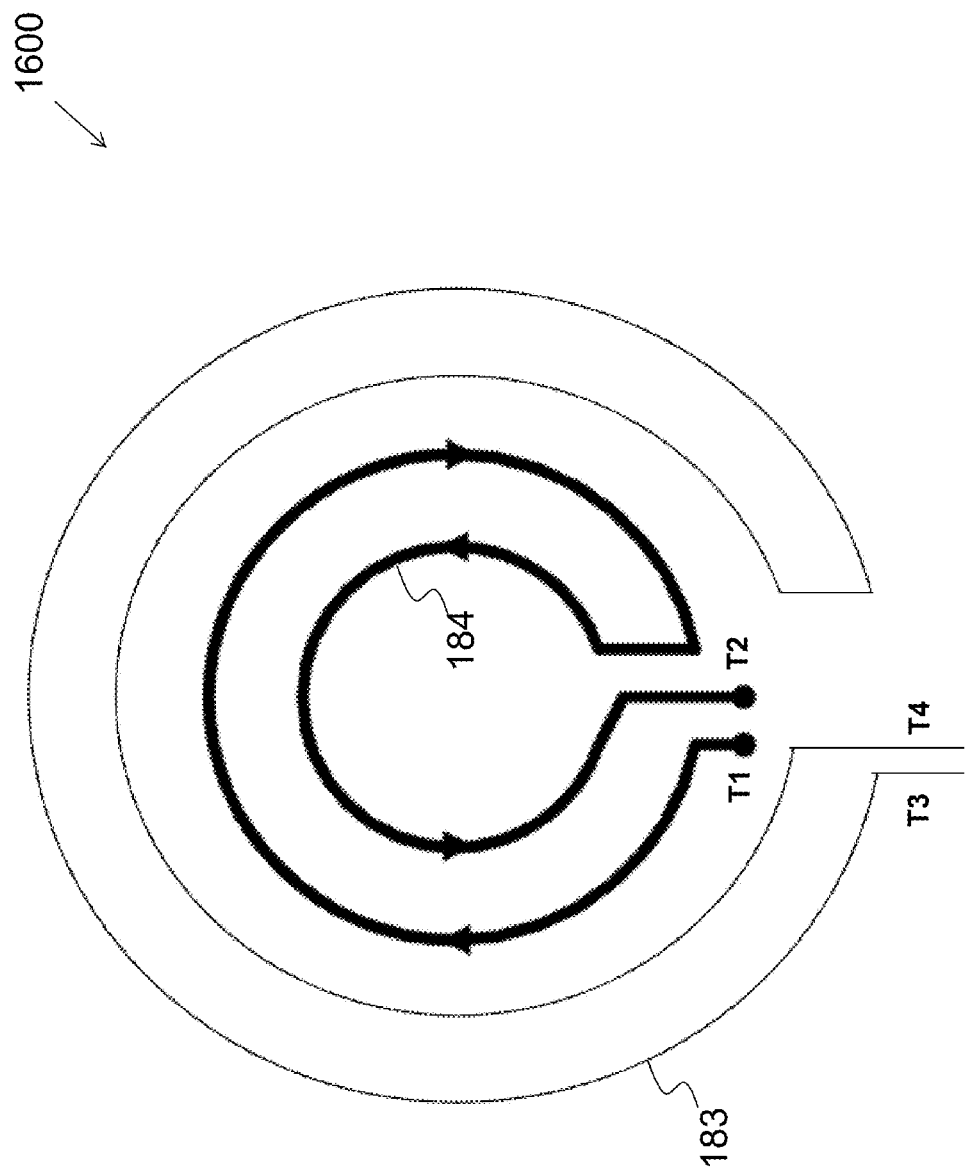
FIG. 16 illustrates yet another coil structure including both a power transfer coil and an auxiliary coil in accordance with various embodiments of the present disclosure.

FIG. 16 illustrates yet another coil structure including both a power transfer coil and an auxiliary coil in accordance with various embodiments of the present disclosure. The coil structure 1600 shown in FIG. 16 is similar to the coil structure 1500 shown in FIG. 15 except that the auxiliary coil 183 has a structure similar to that shown in FIG. 4.

It should be noted that while FIG. 16 illustrates the power transfer coil 184 is surrounded by the auxiliary coil 183, depending on different applications and design needs, the auxiliary coil 183 may be placed in the area surrounded by the power transfer coil 184.

FIG. 17 illustrates yet another coil structure including both a power transfer coil and an auxiliary coil in accordance with various embodiments of the present disclosure. The coil structure 1700 shown in FIG. 17 is similar to the coil structure 1600 shown in FIG. 16 except that the power transfer coil 186 has a conventional one turn structure.

It should be noted that the power transfer coil 186 can be placed either inside the auxiliary coil 185 as shown in FIG. 17 or outside the auxiliary coil 185 depending on different applications and design needs.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A structure comprising:
a plurality of first turns of a coil, wherein the plurality of first turns is formed by a first continuous conductive element; and
a plurality of second turns of the coil having a similar shape as the plurality of first turns of the coil, wherein:
the plurality of second turns is formed by a second continuous conductive element;
the plurality of first turns of the coil and the plurality of second turns of the coil have a similar center position; and
a current flowing through the plurality of first turns of the coil and a current flowing through the plurality of second turns of the coil are in opposite directions.

2. The structure of claim 1, wherein:
the plurality of first turns of the coil is circular in shape.

3. The structure of claim 2, wherein:
the plurality of first turns of the coil starts from a first terminal of the coil and ends at a connection element; and
the plurality of second turns of the coil starts from the connection element and ends at a second terminal of the coil, and wherein:
the plurality of second turns of the coil is surrounded by the plurality of first turns of the coil; and
the first terminal and the second terminal are placed immediately next to each other.

4. The structure of claim 1, wherein:
a turn in the plurality of first turns of the coil has a slightly different shape from a turn in the plurality of second turns of the coil.

5. The structure of claim 1, wherein:
the plurality of first turns of the coil is rectangular in shape.

6. The structure of claim 1, wherein:
the plurality of first turns of the coil is octagonal in shape.

7. The structure of claim 1, further comprising:
a plurality of third turns of the coil and a plurality of fourth turns of the coil, wherein:
the plurality of third turns of the coil and the plurality of fourth turns of the coil have a similar shape and a similar center position; and
a current flowing through the plurality of third turns of the coil and a current flowing through the plurality of fourth turns of the coil are in opposite directions.

8. The structure of claim 7, wherein:
the plurality of first turns of the coil and the plurality of second turns of the coil are placed on a first layer of a printed circuit board; and
the plurality of third turns of the coil and the plurality of fourth turns of the coil are placed on a second layer of the printed circuit board.

9. The structure of claim 8, further comprising:
a via in the printed circuit board and connected between the plurality of second turns of the coil and the plurality of third turns of the coil.

10. A system comprising:
a first coil having a first winding structure comprising:
a plurality of first turns and a plurality of second turns of the first coil having a similar shape, wherein:
the plurality of first turns and the plurality of second turns have a similar center position; and
a current flowing through the plurality of first turns and a current flowing through the plurality of second turns are in opposite directions; and
a second coil having a plurality of turns, wherein the first coil and the second coil are two continuous conductive elements.

11. The system of claim 10, wherein:
the first coil is placed inside the second coil.

12. The system of claim 10, wherein:
the first coil is placed outside the second coil.

13. The system of claim 10, wherein:
one of the first coil and the second coil is configured to transfer power.

14. The system of claim 10, wherein:
one of the first coil and the second coil is configured to transfer communication signals.

15. The system of claim 10, wherein:
one of the first coil and the second coil is configured to transfer both power and communication signals.

16. A method comprising:
wirelessly transferring power from a transmitting coil on a transmitter to a receiving coil on a receiver, wherein each of the transmitting coil and the receiving coil comprises:
   a plurality of first turns and a plurality of second turns having a similar shape, and wherein a current flowing through the plurality of first turns and a current flowing through the plurality of second turns are in opposite directions; and
communicating between the transmitter and the receiver through a communication coil having an 8-shaped structure comprising a first half circle and a second half circle.

17. The method of claim 16, wherein:
the step of communicating between the transmitter and the receiver is achieved by modulating a circuit parameter or an operation parameter of the transmitter.

18. The method of claim 17, wherein:
the communicating between the transmitter and the receiver is through the communication coil placed at the transmitter.

19. The method of claim 16, wherein:
the step of communicating between the transmitter and the receiver is achieved by modulating a circuit parameter or an operation parameter of the receiver.

20. The method of claim 19, wherein:
the communicating between the transmitter and the receiver is through the communication coil placed at the receiver.

\* \* \* \* \*